United States Patent Office 3,227,661
Patented Jan. 4, 1966

3,227,661
METHOD OF PREPARING A CATALYST COMPOSITION BY COPRECIPITATION AT A CONSTANT pH
Robert L. Jacobson, Pinole, and Robert H. Kozlowski, Berkeley, Calif., assignors to Chevron Research Company, a corporation of Delaware
No Drawing. Filed Feb. 28, 1963, Ser. No. 261,877
4 Claims. (Cl. 252—465)

This invention relates to the hydrogenation and purification of hydrocarbon oils by means of catalysts. In particular, the invention relates to novel catalysts and compositions and method of preparing the said catalysts, which catalysts when so prepared are characterized by high specific activity for the removal of contaminating nitrogen compounds from hydrocarbon oils.

This application is a continuation-in-part of our copending application Serial No. 90,382, filed February 20, 1961, and entitled Catalytic Hydrodenitrification Process, now abandoned. This application is also a continuation-in-part of our copending application Serial No. 90,195, filed February 20, 1961, and entitled Hydrogenation of Hydrocarbon Oils With Tungsten-Nickel-Alumina Catalysts, now abandoned. The present invention is based in part on a combination of subject matter separately disclosed in said applications.

It is well known to hydrogenate olefinic and aromatic hydrocarbons in hydrocarbon oils and to treat hydrocarbon oils for the removal of sulfur compounds by hydrogenation in the presence of catalysts. Such processes, commonly termed hydrofining or hydrodesulfurization, are widely used to remove sulfur compounds from petroleum products to prepare feedstocks for reforming and other processes, etc. The process is also known to remove organic compounds of nitrogen, oxygen, halogens, metals, and other contaminants to some extent. It has recently been found that the removal of nitrogenous contaminants is often more important than the removal of sulfur, particularly for color improvement of products or to prepare feedstocks for cracking or hydrocracking processes and the like. In some of these instances, substantially complete removal of the nitrogenous contaminants is most important and makes practical and economically attractive the treatment of contaminated stocks. However, such complete removal of nitrogenous contaminants was most difficult to accomplish under reasonable conditions with previously available processes.

In the aforementioned application, Serial No. 90,382, it is disclosed that for the purpose of substantially completely removing contaminating nitrogen compounds from distillable hydrocarbon oils to low residual nitrogen levels, catalysts containing certain concentrations of both nickel and molybdenum are outstanding in their properties and are not the equivalent of the large group of catalytic materials disclosed in the prior art. Specifically, that application disclosed the use in a hydronitrification process of catalysts comprising sulfided nickel and molybdenum or alumina, containing 4–10% nickel together with 15.5–30% molybdenum, by weight, expressed as the metals. When the catalysts were prepared by impregnation of a predominantly alumina support with compounds of nickel and molybdenum, the catalysts were found to have a peak or maximum activity in the range between about 19% and about 25% molybdenum. In contrast thereto, however, it was also disclosed that a catalyst containing about 8% nickel and about 30% molybdenum had unusually high activity when the catalyst was prepared by simultaneously coprecipitating compounds of molybdenum, nickel, and aluminum.

In the aforesaid application Serial No. 90,195, there is disclosed the preparation of catalysts having certain high nickel and tungsten concentrations and low aluminum concentrations, by simultaneously coprecipitating compounds of tungsten, nickel, and aluminum. These catalysts appeared to be distinct from and of a different class as compared to the nickel-molybdenum-alumina catalysts in that nickel-tungsten-alumina catalysts of the desired high activity could not be prepared by the impregnation techniques found to be so suitable in the case of nickel-molybdenum catalysts. Also, the amounts of the metal components and their relative amounts necessary to obtain high activity appear to be quite different in the nickel-tungsten catalysts as compared to the nickel-molybdenum catalysts even when prepared by similar coprecipitation techniques.

The present invention is based in part on the discovery that certain of the nickel-tungsten catalysts and the nickel-molybdenum catalysts are related, and that the unusually high specific activity for the hydrogenation of nitrogen compounds in contaminated oils is obtained when the catalysts are prepared by a special coprecipitation technique to obtain catalysts containing amounts of the special components corresponding not in terms of their weight percentages, but in terms of their relative amounts by weight and also in terms of the relative amounts of equivalents, or gram-atoms, of the components. Specifically, the catalysts of the present invention are porous oxide catalysts consisting essentially of nickel, aluminum, and one of the catalytically active Group VI metals, tungsten and molybdenum, in relative proportions such that 100 grams of said catalyst contains at least 0.2 gram-atom of aluminum between 0.07 and 0.26 gram-atom of nickel, between 0.17 and 0.31 gram-atom of Group VI metal, and between 2 and 6 grams of Group VI metal per gram of nickel. The catalysts are prepared by forming an aqueous ammoniacal solution containing in solution the Group VI metal, molybdenum or tungsten, and forming an aqueous acidic solution containing in solution nickel and aluminum. The relative concentrations of the metals in the solutions are such that when a portion of the acidic solution is mixed with a portion of the ammoniacal solution to form a mixture with a pH of 7 a coprecipitate forms containing nickel, aluminum, and Group VI metal in relative amounts such that when the coprecipitate is dried and calcined to form a porous oxide catalyst, said catalyst has a composition in the above-described range. The solutions are mixed in the relative proportions such that a pH of about 7 is maintained continuously in the resulting mixture, thereby forming said coprecipitate substantially continuously during the mixing, preferably by simultaneously adding said solutions to a third aqueous medium while controlling the rate of adding one of the solutions relative to the rate of adding the other solution to maintain the pH near 7 in the resulting mixture. The coprecipitate formed by mixing the solutions in the above manner is separated from the mixture and washed thoroughly to remove all occluded salts. The washed coprecipitate is then dried at a temperature maintained below about 300° F. until the coprecipitate develops a rigid alumina structure. Thereafter, the dried coprecipitate is calcined to thereby form the porous oxide catalyst. When the oxide catalysts prepared in the above manner are sulfided, they have unusually high activity for the hydrogenation of nitrogen compounds found in hydrocarbon oils. The catalysts in the oxide form, or reduced, are suitable for use in the hydrogenation of uncontaminated oils.

Catalysts consisting only of tungsten sulfide and nickel sulfide have been previously used for hydrogenation and purification, particularly in Germany. Such catalysts usually have approximately equal molar proportions of nickel and tungsten. Although the use of catalysts having an atomic ratio of nickel to tungsten of about 1:0.75 has been recommended, the relative proportions do not appear to be critical. For example, it is disclosed in U.S. Patent 2,744,052 that a nickel-tungsten catalyst containing 2 mols of nickel per mol of tungsten has about the same activity as a catalyst containing 1 mol of nickel per 2 mols of tungsten. Such catalysts are usually prepared by formation of the metal sulfides directly from mixtures of the metals or of the oxides or other compounds of nickel and tungsten. It has been proposed from time to time to incorporate powdered alumina in the nickel sulfide-tungsten sulfide catalyst by physical admixing. However, in such cases the alumina acts only as a diluent extending or binding agent.

The pure nickel sulfide-tungsten sulfide catalysts are relatively expensive. Consequently, the most popular catalysts in the United States for hydrodesulfurization are probably those comprising cobalt and molybdenum oxides or sulfides on alumina and having a relatively low metal content. These catalysts may be prepared by simultaneous or successive impregnation of cobalt and molybdenum compounds on a preformed alumina support, or by coprecipitation of cobalt and molybdenum compounds on preformed alumina or alumina gel, or by a combination of such procedures, any one of which gives acceptable results for a desulfurization catalyst. It has been found that nickel-tungsten-alumina catalysts can also be prepared by impregnation of the metal compounds on a preformed alumina support. When carefully prepared, these catalysts are usually slightly more active for hydrogenation than the corresponding cobalt-molybdenum catalysts and, as disclosed in U.S. Patent 2,967,204, they are approximately equal in activity to the unsupported nickel sulfide-tungsten sulfide catalysts previously mentioned. The present invention is based in part upon the discovery that certain sulfided tungsten-nickel-alumina catalysts, prepared by coprecipitation, having higher metal contents than the impregnated-type catalysts and lower metal contents than the pure nickel sulfide-tungsten sulfide catalysts, are much more active with respect to hydrogenation of nitrogen contaminants than either of the aforementioned catalysts.

In the method of preparing the porous oxide catalysts in accordance with the invention, an aqueous ammoniacal solution containing one of the Group VI metals, molybdenum or tungsten, is formed by dissolving a suitable compound of the metal such as tungstic acid, molybdic acid, or ammonium paramolybdate in aqua ammonia containing excess ammonia over that required for reaction with the metal. Tungsten in particular is difficultly soluble, but can be brought into solution by a combination of heat, agitation, and time. High purity ingredients are preferably used for maximum solubility and improved activity of the final catalyst.

The aqueous acidic solution containing in solution nickel and aluminum is formed by dissolving acidic salts of nickel and aluminum, such as the chlorides, nitrates, acetates, or less desirably, the sulfates, in water but preferably in water containing some free acid. The metal concentrations in the respective solutions and the amounts of free acid and free ammonia are predetermined and adjusted beforehand so that when a portion of the acidic solution is mixed with a portion of the ammoniacal solution to form a mixture having a pH of 7, a coprecipitate forms containing between 2 and 6 grams of Group VI metal per gram of nickel and amounts of nickel and aluminum such that the coprecipitate contains the metals in the proportions previously set forth. In the preferred method the solutions are mixed by pouring them into a third aqueous medium or volume maintained at a temperature of 50–200° F., and wherein the pH is controlled in the range 6–7. It is especially preferred not to rely on having made up the solutions to the correct strength and normalities so as to attain the desired pH, but that the relative rates of addition of the respective solutions be controlled at all times so as to maintain the pH in the desired range. Thus, for example, the rate of adding one of the solutions is set at a fixed value, and the rate of adding the other solution is automatically controlled in response to a signal from a suitable pH measuring instrument in the third aqueous volume comprising the mixture of the solutions. When the solutions are mixed in this manner, a coprecipitate forms immediately and continuously during the addition. This coprecipitate at all times comprises compounds of the metals in the desired respective proportions. When, however, the pH is not controlled, but is permitted to vary, the relative solubilities of the dissolved metal salts are different as a function of the pH at a particular time, resulting in the precipitation of coprecipitates having varying compositions which may be outside the necessary range. Also, when the pH is not controlled, one or more of the components may precipitate separately on the previously formed coprecipitate of the other metal components. The outer limits on the pH permissible appear to be about 5 and about 8, with better results being obtained in the range 5.5–7.5, still better at 6–7, and especially good results at 7 pH. As indicated, variation on the acid side is less harmful than variation on the basic side.

In one embodiment a high molecular weight organic material, preferably a protein such as animal glue, may be present in one or the other of the solutions, but more preferably in the third medium wherein the solutions are mixed. Suitable materials are protein, cellulosic materials, carbohydrates, various emulsions and colloids such as rubber latex, etc., having molecular weights of $1 \times 10^4$ to $1 \times 10^6$, soluble or despersible in water, and combustible. The presence of such material appears to be helpful in the slow transition from the coprecipitate to the desired catalyst structure during the later low temperature drying step, and makes the coprecipitate more cohesive and easier to handle. However, the use of such materials is not essential to obtaining high activity catalysts of satisfactory physical form.

The third aqueous volume is maintained at a temperature of 50–200° F., the lower limit being set to maintain sufficient fluidity while the higher temperature avoids loss of metals by solution in the supernatant liquid or loss of ammonia by evaporation. The residence time of the coprecipitate in the third aqueous volume is relatively long at 50–200° F. to permit the finely divided coprecipitate to form into a semi-fluid gelatinous mass which can be separated by filtration and the like.

The coprecipitate is separated from the supernatant liquid, which contains ammonium salts of the anions of the nickel and aluminum salts used in the aqueous acidic solution, by decanting, or settling, but preferably by filtration. The coprecipitate is then repeatedly reslurried, filtered, and washed to remove water-soluble ammonium salts and other impurities therefrom. Salts not removed by washing are sublimed or distilled from the catalyst during the drying and calcining steps, resulting in disruption of the alumina lattice and the production of inactive catalysts.

It is important that the initial drying of the washed coprecipitate be carried out slowly and at relatively low temperatures until a rigid alumina structure is formed. It appears that during this initial drying step an alumina lattice structure develops, and that the type of structure formed is dependent on the temperature and the rate of dehydration. Thus, adjustment of the pore volume and surface area of the catalyst can be accomplished by appropriate selection of drying time and temperature within the limits herein. In this way highly selective catalysts having pore diameters tailored to the molecular weight of the feed can be prepared. The initial drying step may extend over 10–50 hours. Three hundred degrees Fahrenheit appears to be slightly below the maximum temperature permissible during the initial drying to produce an active catalyst. Preferably, the temperature is below 250° F. When the initial drying is carried out at about 120° F. the catalyst is significantly more active, especially for the treatment of high boiling oils. Although the exact form of the metals in the finished catalyst is not known, it is believed that the catalyst is not a mere mixture of metal oxides. The criticality of pH control and the initial drying temperature suggests that at least a portion of one of the metals, nickel, tungsten or molybdenum, may actually be incorporated in the alumina lattice. The catalyst produced in this manner is quite unlike any catalyst which could be produced by deposition of metal compounds on a previously formed alumina.

The partially dried catalyst may be formed into pellets, rods, shaped particles, etc., by pelleting, extrusion, or similar means. Alternately, the shaping may be delayed until the final catalyst has been formed by calcination. In any event, the partially dried catalyst is further dried at temperatures preferaby gradually increasing from about 300° F. to above about 700° F., to remove residual moisture, and calcined at a temperature below about 1200° F. to improve the physical strength to the catalyst. The final calcination temperature is preferably between about 900° F. and 1100° F. Above 1200° F., i.e. at 1300° F., catalyst deactivation begins to occur.

To obtain high activity for hydrodenitrification the catalyst must be sulfided to convert the Group VI and nickel oxides predominantly to the sulfides prior to use in the process. Sulfiding is preferably carried out after loading the catalyst into the reactor where it is to be used, by passing over the oxide catalyst a sulfiding agent such as $H_2S$, $CS_2$, mercaptans, disulfides, and the like. When sulfur compounds other than $H_2S$ are employed, hydrogen should also be present and the temperature should be sufficiently elevated for ready conversion of the sulfur compound to $H_2S$, say about 400° F. in the case of mercaptans and disulfides.

The following example illustrates the preparation of a nickel-tungsten-aluminum catalyst in accordance with the invention.

EXAMPLE 1

A first solution was prepared by dissolving 285 g. tungstic acid in 700 ml. water and 420 ml. concentrated ammonium hydroxide. A second solution was prepared by dissolving 213 g. $AlCl_3 \cdot 6H_2O$ and 246 g. $NiCl_2 \cdot 6H_2O$ in 1 liter of water. A third aqueous volume consisting of 1 liter of water was maintained at 120° F. and stirred vigorously. The first and second solutions were poured slowly and at the same rate into the third volume over a one-hour period while maintaining the pH at 6.2–7. The precipitate which formed was filtered from the solution and then washed with 1 liter of water to remove ammonium chloride. The precipitate was then reslurried in one liter of water and refiltered, four times. The washed coprecipitate was then dried overnight at 300° F., pelleted, and then calcined four hours at 900° F. The finished catalyst had a composition of 51.7% by weight tungsten (65% $WO_3$), 14.4% nickel (18.3% NiO), and 7.4% aluminum (14% $Al_2O_3$). The catalyst had a bulk density of 1.16 g./cc., a surface area by nitrogen adsorption of 32 m.²/g., and a pore volume of 0.26 cc./g. Thus, the catalyst (and the coprecipitate) contained 3.6 grams of tungsten per gram of nickel, and 100 grams of the finished catalyst contained 0.28 gram-atom of tungsten, 0.24 gram-atom of nickel, and 0.27 gram-atom of aluminum.

The following example illustrates the preparation of a nickel-molybdenum-aluminum catalyst in accordance with the invention.

EXAMPLE 2

An aqueous ammoniacal molybdenum solution was prepared by combining 100 grams $MoO_3$, 467 milliliters of concentrated aqua ammonia (30%) and 1 liter of water. An acidic solution of nickel and aluminum compounds was formed by dissolving 86 grams of $NiCl_2 \cdot 6H_2O$ and 423 grams of $AlCl_3 \cdot 6H_2O$ in 1200 ml. of water. A third aqueous medium was prepared by having 10 grams of animal glue to 1 liter of distilled water. While stirring the glue-containing solution vigorously, portions of the molybdenum solution and the nickel-aluminum solution were added slowly while continuously checking the pH of the mixture to maintain it between 6 and 7 and maintaining the temperature of the mixture at 100° F. The coprecipitate formed continuously during the mixing. When all of the solutions had been added, the coprecipitate was filtered and washed five times with distilled water. The washed coprecipitate was then dried at 120° F. for 28 hours, at 300° F. for 24 hours, at 500° F. for 24 hours, and at 700° F. for 24 hours, and then calcined at 900° F. for 4 hours. The porous oxide catalyst so produced analyzed 8.2% nickel and 29.8% molybdenum, and had an area of 138 square meters per gram, a pore volume of 0.436 ml. per gram, and a density of 0.767 gram per cubic centimeter after crushing to particles of between 20 and 40 mesh. Thus, the catalyst contained 3.65 grams of molybdenum per gram of nickel. One hundred grams of the finished porous oxide catalyst contained 0.31 gram-atom of molybdenum, 0.14 gram-atom of nickel, and 0.88 gram-atom of aluminum.

The following example illustrates another preparation of another nickel-molybdenum-aluminum catalyst in accordance with the invention.

EXAMPLE 3

Solutions were made up in the same manner and with the same amounts and proportions of ingredients as in Example 2, and the coprecipitate was then formed by mixing the solutions, but holding the mixture at room temperature. The preparation differed primarily in the drying step, wherein the thoroughly washed coprecipitate was dried 24 hours at 300° F., and then further dried and calcined for 24 hours at 400° F., 24 hours at 600° F., 24 hours at 800° F., and 4 hours at 900° F. The finished porous oxide catalyst had substantially the same physical properties and composition as the catalyst of Example 2.

The following example illustrates the preparation of another nickel-tungsten-alumina catalyst in accordance with the invention.

EXAMPLE 4

A first solution was prepared by dissolving 285 g. tungstic acid in 1800 ml. water and 650 ml. concentrated ammonium hydroxide. A second solution was prepared by dissolving 426 g. $AlCl_3 \cdot 6H_2O$ and 246 g. $NiCl_3 \cdot 6H_2O$ in 1200 ml. water. A third solution was prepared by dissolving 15 g. brown flake animal glue in 1 liter of water. The first and second solutions were added at the same rate over a two-hour period to the third volume while holding the pH at 6.5–7.0. The precipitate was filtered and washed 5 times to remove ammonium chloride. The washed coprecipitate was then dried at 120° F. for 48 hours. The dried material was then further dried for 24 hours each at 300° F., 500° F., and 700° F., and then calcined at 900° F. for 4 hours. The finished catalyst analyzed 46.5% tungsten (58.5% $WO_3$), 12.6% nickel (16% NiO), and 10.3% aluminum (19.5% $Al_2O_3$). The catalyst had a bulk density of 0.93 g./cc., a surface area by nitrogen adsorption of 147 m.²/g., and a pore volume of 0.42 cc./g. Thus, the catalyst contained 3.65 grams of tungsten per gram of nickel, and 100 g. of the catalyst contained 0.25 gram-atom of tungsten, 0.21 gram-atom of nickel, and 0.38 gram-atom of aluminum.

The following example illustrates the preparation of a nickel-molybdenum-alumina catalyst by coprecipitation wherein the pH was not carefully controlled. As shown by further examples hereinafter, this resulted in an inferior catalyst.

EXAMPLE 5

An ammoniacal solution of ammonium molybdate, having the same composition as in Example 2, and an acidic solution of nickel and aluminum chloride, having the same composition as in Example 2, were added at equal rates to an aqueous medium also having the same composition as in Example 2. In this case, however, the pH was not measured and controlled during the addition, it having been assumed that the compositions had been correctly prepared so that when added at equal rates a pH of 7 would result. After all of the solutions had been added, however, the pH of the mixture was measured and was found to be 4.1. About 80 milliliters of ammonium hydroxide and 130 milliliters of water was added to the mixture to adjust the pH to 7.1. The precipitate was then carefully washed as before and dried for 20 hours at 200° F., for 24 hours at 300° F., and then calcined for 4 hours at 900° F. The catalyst analyzed 9.6% nickel and 28% molybdenum, and was to all outward appearances substantially identical to the catalysts of Examples 2 and 3.

The following example describes the preparation of a nickel-tungsten-alumina catalyst by the methods of the prior art, for purposes of comparison in later examples herein.

EXAMPLE 6

A preformed alumina extrudate (Harshaw) was impregnated with nickel nitrate, dried 10 hours at 400° F., and calcined 4 hours at 900° F. The catalyst particles were then impregnated by immersion in a solution of ammonium tungstate prepared by dissolving 80 g. of tungstic acid in 288 ml. water and 96 ml. concentrated ammonium hydroxide. The catalyst was then dried and calcined in the same manner as in Example 4. This material was then given an additional impregnation with ammonium tungstate, dried, and calcined in the same manner. The finished catalyst contained 18.8% tungsten and 6.8% nickel, and had a surface area by nitrogen adsorption of 192 m.$^2$/g. and a bulk density of 0.88 g./cc.

The activities of catalysts prepared in the foregoing examples for the hydrogenation of nitrogen compounds contained in hydrocarbon oils to ammonia (hydrodenitrification) were determined in relative activity tests, the results of which demonstrate the suprising catalytic properties imparted to the catalysts by the method of preparation. It has been found that the hydrodenitrification reaction closely approximates a pseulo first-order rate reaction with respect to the fractional removal of the initial nitrogen content over the range of operating conditions utilized, i.e., $-\log(1-x) = kt$, where $x$ is the percent nitrogen removal expressed as a decimal, $t$ is the contact time (inversely proportional to LHSV), and $k$ is the reaction rate constant (proportional to relative activity). By comparing catalysts at the same operating conditions of temperture and pressure with a given feed, the reaction rate constant can be determined and the catalysts can accordingly be ranked in terms of relative activity. On this basis a relative activity for hydrodenitrification of 1.0 has been assigned to a commercially available Co–Mo hydrofining catalyst, containing 6.8 weight percent molybdenum and 2.7% cobalt, prepared by the method described in Patent No. 2,878,193 to J. W. Scott. Other commercially available hydrofining catalysts composed of molybdenum and nickel or cobalt supported on alumina or silica-alumina of similar metal contents have been found to be substantially equivalent to this catalyst in terms of relative activity for nitrogen removal. On the other hand, catalysts consisting essentially of nickel, molybdenum, and alumina and containing between 4 and 10% nickel and between 15.5 and 30% molybdenum have been found to be from 3 to 5 times as active for nitrogen removal when sulfided, as disclosed in our previously-mention application S.N. 90,382. In particular, a specially prepared catalyst, containing about 7% nickel and about 21% molybdenum on alumina, preprepared by successive impregnations of a preformed alumina with nickel nitrate and aluminum molybdate, has a relative activity of about 4.5 as compared to the conventional cobalt-molybdenum hydrofining catalysts.

EXAMPLE 7

Several of the catalysts prepared in the foregoing examples were tested for hydrodenitrification activity in removing nitrogen compounds for a light catalytically cracked cycle oil and from a heavy catalytically cracked cycle oil, by hydrogenation to ammonia. The feed properties, conditions used, and the results obtained are shown in the following Tables I and II, wherein Table I shows the results of treating the light cycle oil and Table II shows the results of treating the heavy cycle oil. In each case comparisons are presented with the conventional Co–Mo–alumina hydrofining catalyst and with the highly active 7% Ni–21% Mo catalyst prepared by impregnation of alumina. The runs were carried out in laboratory pilot reactors of identical construction, and all of the catalystes were sulfided in the reactors by contacting with dimethyldisulfide in hydrogen at about 500° F. before contacting with the oil.

*Table I*

| Catalyst | Example 1 | Impregnated 7% Ni–21% Mo | Co-Mo-Al | Example 5 | Example 6 |
| --- | --- | --- | --- | --- | --- |
| Temperature, ° F | 630 | 616 | 616 | 620 | 618 |
| Pressure, p.s.i.g | 800 | 800 | 800 | 800 | 800 |
| Space Velocity, LHSV | 1.0 | 0.8 | 1.0 | 1.0 | 1.0 |
| H$_2$ Throughput, s.c.f./bbl | 4,000 | 4,300 | 4,000 | 4,000 | 4,000 |

| Inspections | Light Cycle Oil | Product | Product | Product | Product | Product |
| --- | --- | --- | --- | --- | --- | --- |
| Gravity, ° API | 25.8 | 31.1 |  | 29.7 |  | 30.1 |
| Aniline Point, ° F | 97 | 114.5 |  | 102 | 103 | 104 |
| Boiling Range, ° F.: |  |  |  |  |  |  |
| 5% | 466 | 418 |  | 430 |  |  |
| 50% | 508 | 488 |  | 495 |  |  |
| 95% | 571 | 550 |  | 571 |  |  |
| Sulfur, wt. percent | 0.89 | [1] 95 |  | [1] 69 | [1] 128 |  |
| Nitrogen, p.p.m | 775 | 0.7 | 0.6 | 100 | 60 | 55 |

[1] Parts per million.

Table II

| Catalyst | Example 3 | Example 4 | Impregnated 7% Ni-21% Mo | Co-Mo-Alumina |
|---|---|---|---|---|
| Temperature, °F | 700 | 695 | 695 | 665 |
| Pressure, p.s.i.g | 1,300 | 1,300 | 1,260 | 1,200 |
| Space Velocity, LHSV | 1.3 | 1.3 | 1.0 | 1.3 |
| H₂ Throughput, s.c.f./bbl | 4,000 | 4,500 | 4,500 | 4,000 |

| Inspections | Heavy Cycle Oil | Product | Product | Product | Product |
|---|---|---|---|---|---|
| Gravity, °API | 21 | | | | |
| Aniline Point, °F | 156 | | 167.5 | | |
| Boiling Range, °F.: | | | | | |
| 5% | 608 | | | | |
| 50% | 698 | | | | |
| 95% | 793 | | | | |
| Sulfur, wt. percent | 1.9 | | | | 0.15 |
| Nitrogen, p.p.m. | 550 | 29 | 4.5 | 6 | 133 |

The above data show that the nickel-tungsten-alumina catalyst coprecipitated in accordance with the invention as in Example 4 has the highest activity for removal of nitrogen compounds from the oils. The similar catalyst of Example 1 has slightly lower activity, but both are superior to the 7% nickel-21% molybdenum catalyst prepared by impregnation of alumina, which catalyst is itself markedly superior to the prior art catalysts as exemplified by the cobalt-molybdenum-alumina catalyst. The catalyst of Example 3, comprising nickel, molybdenum, and aluminum coprecipitated in accordance with the invention, is also highly active as compared to the prior art catalysts. The catalyst of Example 2 has substantially the same activity as the catalyst of Example 3, indicating that the drying temperature is not critical with respect to these catalysts, provided the temperature is not substantially in excess of 300° F. during the initial drying. However, it will be noted that the catalysts of Examples 2 and 3 were subjected to extensive drying at more elevated temperatures as compared in particular to the most active catalyst, namely the catalyst of Example 4, which was dried slowly and for a long time at a temperature of only 120° F.

The less satisfactory results using the catalyst of Example 5 show that the failure to control the pH during the coprecipitation leads to the production of catalysts not exhibiting the unusually high activity of the catalysts of this invention, even though the physical properties in terms of surface area and composition appear satisfactory.

Similarly, the unsatisfactory results using the catalyst of Example 6 shows that nickel-tungsten catalysts prepared by impregnation are inferior to the coprecipitated catalysts of this invention. These results also indicate that a substantially greater amount of tungsten would be required in catalysts of this type as compared to the amount of molybdenum which would be required.

Another catalyst, which was prepared by impregnation of alumina with ammonium tungstate and nickel nitrate, contained 28% by weight tungsten and 4.7% by weight nickel. This catalyst was no better than the catalyst of Example 6, being in fact quite similar in activity.

Other catalysts were prepared by coprecipitating only the tungsten and aluminum components, drying, calcining, and then impregnating with nickel nitrate, drying and calcining. Specifically, catalysts were prepared containing 31% tungsten with 6.4% nickel, and 25% tungsten with 7.5% nickel. These catalysts were only about 60% as active as the catalysts of this invention prepared by simultaneous coprecipitation of all three of the metals, as in Examples 1 and 4.

In the foregoing examples of preparation of catalysts in accordance with the invention the washed coprecipitate was dried quite slowly in an oven with a moderate to low air flow. Because of the low air flow rate in the equipment the evaporation of water proceeded quite slowly. In large scale production it would probably be possible to use a much higher air flow rate and thereby to decrease substantially the time consumed in drying the material. Nevertheless, the temperature should be carefully watched so as not to go much above 300° F. until most of the water is removed. In the case of both the tungsten and molybdenum preparations, the wet coprecipitate is a fluffy pale green material having a large amount of loosely bound water. After calcining, the material usually has a light gold-brown or tan appearance if correctly prepared. When dried at too high a temperature, the catalyst was chocolate brown. Catalysts of similar composition prepared by impregnation of alumina with nickel and then molybdenum, however, usually have a grayish-green appearance after calcining, from which it may be concluded that a different type of combination of the metal components is achieved by the coprecipitation method of this invention.

As previously mentioned the catalysts of this invention have particularly high activity for hydrogenation processes, particularly for the removal of nitrogen compounds from hydrocarbon oils. In the process the hydrocarbon oil is passed into contact with the catalyst, contained in a reaction zone, while also passing excess hydrogen over and above that consumed in hydrogenation reactions into contact with the catalyst. The resulting $NH_3$ is separated from the oil effluent of the reaction zone, for example by water washing.

Conditions used in the hydrogenation process of the invention are a temperature of 500–850° F., a pressure of 200–4000 p.s.i.g., a space velocity of 0.2–10 LHSV, and a hydrogen throughput of 1000–10,000 s.c.f. per barrel of oil. The process may be one of mild hydrofining, hydrogenation of an uncontaminated hydrocarbon oil, simultaneous hydrogenation and purification, substantially complete hydrodenitrification, or simultaneous hydrocracking and purification. For mild hydrofining a temperature of 550–700° F. and a pressure of 200–2000 p.s.i.g. are preferred. For hydrogenation of uncontaminated stocks, a temperature of 500–650° F. and a pressure of 1500–3000 p.s.i.g. are used. For simultaneous hydrogenation and purification, the temperature should be in the range 600–700° F. and the pressure 1500–3000 p.s.i.g. For substantially complete hydrodenitrafication, a temperature of 600–750° F. and a pressure of 500–2500 p.s.i.g. are selected. For simultaneous hydrocracking and purification of heavy oils, a temperature in the neighborhood of 750–800° F. and a pressure of 2000–3000 p.s.i.g. should be used. The space velocity in all cases is preferably in the range 0.5–5 LHSV, being adjusted downward in the case of the higher boiling and cracked feedstocks. Hydrogen throughput is sufficient to maintain a substantial partial pressure of excess hydrogen.

The catalysts have long life and are deactivated only slowly by the deposition of coke in the treatment of high boiling feeds. Consequently, the process is most advantageously carried out utilizing one or more fixed beds of catalyst contained in one or more reactors through which the oil and hydrogen are passed at the selected conditions. However, the conditions may be such that one reactor is regenerated periodically while the others are on-stream. The process may also be carried out using a fluidized bed or gravitating bed of catalyst with continuous or periodic withdrawal of a side-stream for regeneration. Various other process modifications will become obvious to those familiar with the hydrogenation processes of the art.

We claim:

1. The method of preparing a porous oxide catalyst characterized when sulfided by high activity for hydrogenation for nitrogen compounds occurring in hydrocarbon oils, which method comprises combining by mixing an aqueous ammoniacal solution containing one of the Group VI metals molybdenum and tungsten with an aqueous acidic solution containing nickel and aluminum in relative proportions such that a pH of about 7 is maintained continuously in the resulting mixture, thereby precipitating simultaneously compounds of nickel, aluminum, and Group VI metals as a coprecipitate containing between 2 and 6 grams of Group VI metal per gram of nickel, separating the coprecipitate and washing it to remove occluded salts, drying at a temperature maintained below 300° F. until a rigid alumina structure is formed, and calcining the dried coprecipitate to thereby form a porous oxide catalyst containing per 100 grams of catalyst at least 0.2 gram-atom of aluminum, between 0.07 and 0.26 gram-atom of nickel, and between 0.17 and 0.31 gram-atom of Group VI metal, said solutions having been prepared with relative concentrations of the respective metals to provide such a composition.

2. The method of claim 1 wherein said ammoniacal solution and said acidic solution are mixed by simultaneously adding said solutions to a third aqueous medium maintained at a temperature of 50–200° F. while maintaining the rate of adding one of said solutions constant, continuously monitoring the pH in said third aqueous medium, and controlling the relative rate of adding the other solution to maintain a pH of about 7 in the resulting mixture.

3. The method of claim 1 wherein said Group VI metal is molybdenum.

4. The method of claim 1 wherein said Group VI metal is tungsten.

References Cited by the Examiner
UNITED STATES PATENTS

| | | | |
|---|---|---|---|
| 2,356,576 | 8/1944 | Free et al. | 252—439 |
| 2,449,295 | 9/1948 | Gutzeit | 252—466 |
| 2,689,266 | 9/1954 | Coonradt et al. | 252—465 X |
| 2,697,066 | 12/1954 | Sieg | 252—465 X |
| 2,744,052 | 5/1956 | Nozaki | 252—439 |
| 2,878,193 | 3/1959 | Scott | 208—216 |
| 2,905,625 | 9/1959 | Berger | 208—254 |
| 2,914,470 | 11/1959 | Johnson et al. | 208—264 |
| 2,952,626 | 9/1960 | Kelley et al. | 208—210 |
| 2,953,519 | 9/1960 | Bercik et al. | 208—216 |
| 3,078,238 | 2/1963 | Beuther et al. | 252—465 X |
| 3,114,701 | 12/1963 | Jacobson et al. | 252—439 X |

BENJAMIN HENKIN, *Primary Examiner.*

ALPHONSO D. SULLIVAN, MAURICE A. BRINDISI,
*Examiners.*